United States Patent [19]

Valdés et al.

[11] Patent Number: 5,438,656
[45] Date of Patent: Aug. 1, 1995

[54] RASTER SHAPE SYNTHESIS BY DIRECT MULTI-LEVEL FILLING

[75] Inventors: Jacobo Valdés, Palo Alto; Eduardo Martínez, Los Altos, both of Calif.

[73] Assignee: Ductus, Inc., Mountain View, Calif.

[21] Appl. No.: 70,135

[22] Filed: Jun. 1, 1993

[51] Int. Cl.⁶ .............................................. G06F 15/68
[52] U.S. Cl. ...................................................... 395/143
[58] Field of Search ............... 395/141, 142, 143, 119, 395/125, 134; 345/115, 116, 118

[56] References Cited

U.S. PATENT DOCUMENTS

| | | | |
|---|---|---|---|
| 4,158,200 | 6/1979 | Seitz et al. | 340/750 |
| 4,607,340 | 8/1986 | Nagai | 364/521 |
| 4,851,825 | 7/1989 | Naiman | 340/728 |
| 5,043,711 | 8/1991 | Harrington | 340/728 |
| 5,115,402 | 5/1992 | Matsushiro et al. | 395/141 |
| 5,237,650 | 8/1993 | Priem et al. | 395/143 |
| 5,287,442 | 2/1994 | Alcorn et al. | 395/143 |

OTHER PUBLICATIONS

Naiman, A., et al., "Rectangular Convolution for Fast Filtering of Characters", *Computer Graphics*, vol. 21, No. 4, pp. 233–242 (Jul. 1987).
Abe, H., et al., "High Quality Gray-Scale Kanji Font Generation Using Automatic Stroke Displacement", *Raster Imaging and Digital Typography II*, R. A. Morris and J. Andre eds., pp. 147–155 (1991).
Kajiya, J., et al., "Filtering High Quality Text for Display on Raster Scan Devices", *Computer Graphics*, vol. 15, No. 3, pp. 7–15 (1981).
Leler, W. J., "Human Vision, Anti-aliasing, and the Cheap 4000 Line Display", *Computer Graphics*, vol. 14, No. 3, pp. 308–313 (1980).
Warnock, J., "The Display of Characters Using Gray Level Sample Arrays", *Computer Graphics*, vol. 14, No. 3, pp. 302–307 (1980).
Adobe Systems Incorporated, *PostScript Language Reference Manual*, pp. 70–71 (Addison Wesley, 1985).
Bigelow, C., et al., "Digital Typography", *Scientific American*, vol. 249, No. 2, pp. 106–119 (1983).
Brand, S., *The Media Lab: Inventing the Future at MIT*, pp. 170–172 Penguin, New York (1987).
Crow, F. C., "The Use of Grayscale for Improved Raster Display of Vectors and Characters.", *Computer Graphics*, vol. 12, No. 3, pp. 1–6 (1987).
Negroponte, N., "Soft Fonts", *Proceedings, Society for Information Display* (1980).
Schmandt, C., "Fuzzy Fonts", *Proceedings of the National Computer Graphics Association* (1983).

*Primary Examiner*—Phu K. Nguyen
*Attorney, Agent, or Firm*—Townsend and Townsend Khourie and Crew

[57] ABSTRACT

A method of synthesizing multi-level raster shapes directly from outlines describing ideal shapes is disclosed. A raster shape suitable for approximating the ideal shape in a raster display device is synthesized by dividing a plane into a plurality of pixel areas according to a pixel grid, then by representing the shape as one or more arcs in the plane, where the arcs collectively, and in conjunction with an insideness criterium, divide the plane into an inside region and an outside region, and then by separating the pixels into inside pixels, outside pixels, and boundary pixels. The raster shape comprises coverage values assigned to each pixel in the plane, where inside pixels are assigned a coverage value of 1, outside pixels a coverage value of 0 and the boundary pixels a coverage value between 0 and 1 approximating the degree to which the boundary pixel is covered by the inside of the outline. Initially, boundary pixels are assigned a coverage value of 0 or 1 based on a pixel-coverage criterium, and then it is corrected by a correction value resulting in a coverage value between 0 and 1. The correction value for a pixel might be a numerical value indicating the fraction of the pixel covered by the correction region; the correction value may also depend on the geometry of the correction region represented by the valve and the region's location within the pixel. The correction region of a boundary pixel is the signed difference between the region represented by the initial coverage value assigned to the pixel and the actual region of the pixel covered by the inside of the outline.

22 Claims, 11 Drawing Sheets

FIG. 8a 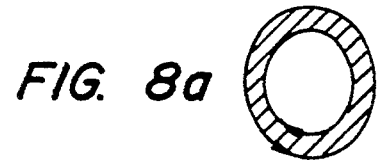 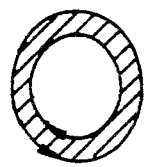 FIG. 8a-1
FIG. 8b 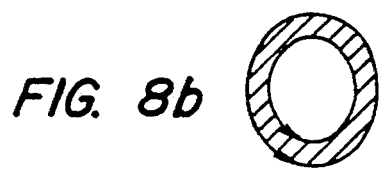 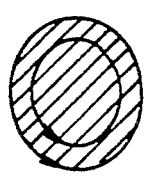 FIG. 8b-1
FIG. 8c 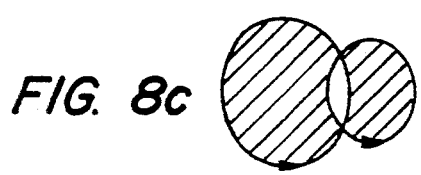  FIG. 8c-1
FIG. 8d 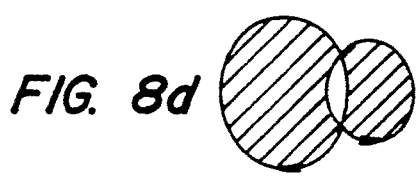  FIG. 8d-1
FIG. 8e 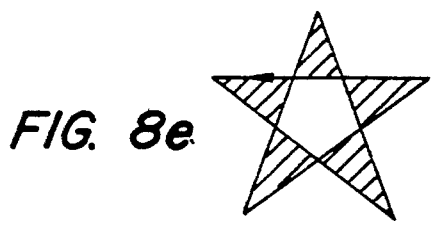 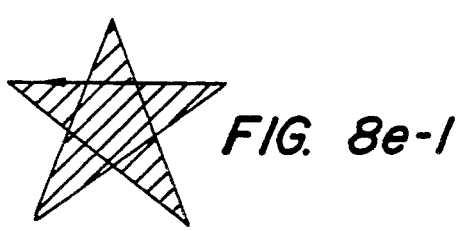 FIG. 8e-1

RASTER SHAPE SYNTHESIS BY DIRECT MULTI-LEVEL FILLING

BACKGROUND OF THE INVENTION

The present invention relates to the field of raster shape synthesis, i.e., the creation of shapes for display on a raster display device. More specifically, in one embodiment of the invention, multi-level raster shapes are synthesized efficiently.

A raster display device comprises a rectangular array of uniformly spaced picture elements, or pixels. A pixel is the smallest independent element of the raster device which can be addressed and each pixel can be made to take on a color selected from a range of colors which are displayable by the device. A raster device can display an image of virtually any two-dimensional shape, by coloring a group of pixels so as to collectively suggest the desired shape. It is this flexibility, that any device can represent any shape, which has made raster devices the preferred output devices for today's computers and many consumer products. Dot matrix printers, laser printers, facsimile machines, video game displays, high-definition televisions, and computer monitors are all examples of raster display devices.

A raster shape is an entity that can be used to display a shape on a raster device by specifying which pixels to use to produce its likeness. For example, the shape may be a character taken from a font at a given point size, and the raster shape would tell which group of pixels could be used to produce a rendition of the character. Because pixels of real raster devices have finite size, a raster shape is necessarily finite and discrete and therefore can only approximate many common shapes which are continuous. This is the case even when the shape can be described succinctly with arbitrary precision. For example, a circle is precisely described by its center and its radius, however any group of pixels used to display that circle cannot perfectly represent the circle. Thus, a raster shape is only a representation of an ideal shape. The raster shape synthesis task comprises the computation of a raster shape which approximately represents a continuous, arbitrarily precise, description of a shape.

Typically, a raster shape is a rectangular array of "coverage" values corresponding to a portion of the array of pixels of a raster device. Each pixel in the array is assigned a coverage value which indicates whether the pixel is part of the raster shape or not. By convention, pixels that are part of the shape ("inside pixels") are assigned an coverage value of 1 and those pixels that are not part of the shape ("outside pixels") are assigned a value of 0. In some raster shapes, certain pixels ("boundary pixels") may be given fractional coverage values between 0 and 1. In order not to have to compute or store more coverage values than necessary, it is customarily assumed that pixels not explicitly assigned a coverage value are outside the shape, that is, they have a coverage value of 0.

The simplest raster shapes are bi-level representations of an ideal shape, where all the pixels have coverage values of either 0 or 1, that is, each pixel is designated as being either an inside pixel or an outside pixel. Multi-level raster shapes may, in contrast, include pixels with coverage values between 0 and 1 to capture the fact that an ideal shape may be approximated more precisely if certain pixels are allowed to be part inside pixel and part outside pixel. Herein, such pixels will be termed "boundary pixels". Typically, the coverage values used in a multi-level raster shape are not real numbers with arbitrary precision but rather numbers taken from a finite set of levels, such as 0, ¼ and 1. In principle, the higher the number of levels, the more precisely a multi-level raster shape can approximate an ideal shape. In practice, however, using more than roughly 16 levels produces only marginal improvements, when the measure of improvement is the visual perception of the shape by a person viewing the raster shape.

A multi-level raster shape contains more information than a bi-level raster shape with the same number of pixels. Some raster devices may be capable of using the additional nformation to improve the appearance of the raster shapes displayed. The improvement is more marked when the number of pixels used to represent the ideal shape is small. As the number of pixels grows, the raster shape more closely approximates the ideal shape, and the differences between bi-level and multi-level raster shapes at a given resolution become less and less noticeable. Multi-level raster shapes are therefore particularly useful to depict small objects on raster display devices which have a low resolution. One common example of these circumstances is the display of character shapes on computer screens, and for this task multi-level raster shapes offer notable improvements over the bi-level raster shapes in common use today.

A raster shape does not specify color. For example, a bi-level raster shape for a circle can be used equally well to display a black circle or a red circle, by making the pixels inside the raster shape black or red and leaving those outside the raster shape unchanged. The partial coverage values in a multi-level raster shape are also devoid of color. When displaying a shape, the intermediate coverage value of a boundary pixel is interpreted as an indication that the color of the pixel should be computed by an interpolation of the color of the shape and the color of the background, with higher coverage values indicating a higher proportion of the shape color in the mixture. The mixed colors thus obtained smooth the transition between the inside and the outside of the shape and improve its appearance. The need to blend the shape and background colors restricts the use of multi-level raster shapes to raster devices capable of displaying a large number of colors or shades of one color. Commonly used raster shapes, particularly characters, are very often drawn in black over a white background; in that case multi-level raster shapes produce gray shades (mixtures of black and white) around the edge of the shape. For this reason, multi-level raster shapes are often called "gray-level". The term "gray-level" is avoided herein, as it is misleading because it implies an nonexistent association between the raster shape and the colors produced when using the raster shape.

Description of Ideal Shapes

As stated above, the input to the raster shape synthesis process is an "ideal" shape, such as the circle used as an example earlier. It is common practice today to represent an ideal shape by an outline comprising one or more contours, where a contour is a trajectory placed in a two-dimensional cartesian plane, where the contour is oriented (i.e., it has a beginning point and an end point, and therefore a direction), closed (i.e., the beginning point and end point coincide), and infinitely thin. Such an outline 10 is shown in FIG. 3(a). Outline 10 comprises contour 12 and contour 14.

As FIG. 3(b) shows, contours such as 12 and 14 often comprise a sequence of oriented curve segments or arcs (12a–d and 14a–d), where the end point of one arc is the starting point of the next and the end point of the last arc is the starting point of the first arc. The arcs themselves are commonly pieces of simple analytic forms such as straight lines, conic sections, or parametric curves of small degree. In most cases, an arc can be described exactly with a small amount of numeric data and can be manipulated geometrically (e.g., scaled, rotated, translated) by performing simple arithmetic calculations on its numerical form.

An outline placed somewhere on the cartesian plane can be used to separate the points of the plane into two sets, the outside and the inside of the outline. In addition to the outline, this point separation process requires the use of a convention or "pixel-coverage" criterium for determining whether a point is inside or outside. For example, referring to FIG. 3(a), the inside of outline 10 may comprise the points between contours 12 and 14, or comprise the points inside the outermost contour 12. Putting aside a discussion of the different pixel-coverage criteria for now, the following discussion is limited to examples involving "simple outlines", i.e., outlines comprising exactly one contour that does not intersect itself. The notion of the inside of a simple outline such as outline 24 in FIG. 4(b) is quite intuitive, therefore a more formal definition of the inside of a general outline is not necessary to understand the current discussion.

Ideal shapes are therefore defined by an infinite collection of dimensionless points inside an outline. Raster shape synthesis comprises approximating the ideal shape by a collection of coverage values for pixels that have finite dimensions, the coverage value for each pixel being an estimate of the portion of the pixel that is covered by points inside the outline.

Synthesizing Raster Shapes from Ideal Shapes

FIGS. 4(a)–(f) illustrate the synthesis of a raster shape from an ideal shape. FIG. 4(a) shows an ideal shape 20 superimposed on a two-dimensional pixel grid 22, and FIG. 4(b) shows a single-contour outline 24 representing ideal shape 20 superimposed on pixel grid 22. Each square of pixel grid 22 represents a pixel 26 of the raster display device on which the raster shape is to be displayed, and pixel grid 22 represents therefore part of the display surface of the raster device. FIG. 4(b) also shows a coordinate system along the axes of pixel grid 22 which is used to specify pixels 26 in pixel grid 22 as well as points within those pixels. Note that, in FIG. 4(b), outline 24 separates the points of pixel grid 22 into an outside and an inside.

FIG. 4(c) shows, numerically, a bi-level raster shape synthesized from outline 24 for pixel grid 22. Each pixel 26 in pixel grid 22 is assigned a coverage value, either 0 for pixels outside outline 24 or 1 for pixels inside outline 24. For those boundary pixels not entirely inside or outside outline 24, a coverage value of 0 or 1 must be chosen according to some insideness criterium applied to the points encompassed by the boundary pixel.

Perhaps the most intuitive pixel-coverage insideness criterium is the "50% coverage" criterium, where a pixel is assigned a coverage value of 1 if 50% or more of the pixel's surface is inside the outline, and otherwise it is assigned a coverage value of 0. Another commonly used pixel-coverage criterium is the "center containment" criterium, where a pixel is inside the outline if the center of the pixel is inside the outline. Yet another pixel-coverage criterium is the "upper left corner containment" criterium which considers a pixel inside if the upper left corner of the pixel is inside the outline.

FIG. 4(d) shows a representation of a multi-level raster shape synthesized from outline 24 for pixel grid 22. Each pixel 26 in the pixel grid is assigned a coverage value between 0 and 1, with 0 for pixels entirely outside outline 24, 1 for pixels entirely inside outline 24, and values between 0 and 1 for pixels on the boundary of outline 24. The coverage value assigned to a boundary pixel approximates the fraction of the pixel 26 which is inside outline 24.

FIGS. 4(e)–(f) depict how the coverage values of pixels are used to display a raster shape on a raster device. The desired image is shown in FIG. 4(a) as ideal shape 20, which is a black shape over a white background in a certain position on a raster display device whose pixels are represented by pixel grid 22. The desired image is not obtainable exactly because each pixel of the raster display device must be shaded with only one color. Therefore the ideal shape must instead be approximated as shown in FIGS. 4(e)–(f). Note that in FIG. 4(f) the coverage values between 0 and 1 produce shades of gray as the result of interpolating between the black color of the figure and the white of the background.

It should be apparent that raster shapes such as those depicted numerically in FIGS. 4(c) and (d), and visually in FIGS. 4(e) and (f), are naturally represented as arrays of values in a computer memory. It should also be apparent that a raster shape can be used to display the shape in different positions of the raster display device by displacing the raster shape over the display, that is, changing the relative position of pixel grid 22 with respect to the pixels of a display device. Thus, a raster shape may be synthesized once for a given ideal shape and used repeatedly to represent the ideal shape in different locations on the display device separated by an integral number of pixels, and each instance may be displayed using a different color.

The Cost of Computing Raster Shapes from Ideal Shapes

The synthesis of a bi-level raster shape is inexpensive compared with conventional methods of synthesizing multi-level raster shapes. Efficient methods of computing a bi-level raster shape require a number of computational steps proportional to the length of the outline measured in pixels, plus a number of steps proportional to the area covered by the ideal shape measured in pixels. Computational processes, such as the synthesis of a bi-level raster shape, which require a number of steps proportional to the size of its input (the outline) and its output (the number of pixels covered by the shape) are for most practical purposes optimal.

In contrast, the typical synthesis of a multi-level raster shape requires considerably more computation. One common method involves the steps of synthesizing a bi-level raster shape several times bigger than the desired multi-level raster shape, convolving the bi-level coverage values thus obtained with a spatial filter, and resampling the filtered result to produce a multi-level raster shape of the desired size. For this process to produce, say, coverage values for each pixel which can vary among 256 levels in the final multi-level raster shape, the process must start with a bi-level raster shape covering 256 times as many pixels. This is typically done by synthesizing a bi-level raster shape from an outline scaled up by a factor of the square root of 256, or 16. From this scaling step and the above description of the cost of computing a bi-level raster shape, it follows that even if the cost of the convolution operation is ignored (and convolution is in fact a very costly operation), the synthesis of a multi-level raster shape using this method requires between 16 and 256 times more operations than an efficient method to compute a bi-level raster shape of the same size would require.

U.S. Pat. No. 4,851,825 (issued to Naiman in July, 1989) discloses such a means for synthesizing a multi-level raster shape. This method, which is directed to characters in a font, begins with "master characters", bi-level raster shapes considerably larger than the desired multi-level raster shapes. To produce the desired multi-level raster shape, a master character is convolved with a spatial filter and sampled. Naiman does not concern itself with the creation of the master characters, but is directed to the process of making the convolution process more efficient. Even if the convolution process were computationally free, however, the need for a large bi-level raster shape as the input already makes the process considerably more expensive than the synthesis of a bi-level raster shape of the same size.

The notions of computational cost just discussed can be made more precise as follows. If we denote the length of an outline by L, where L is the number of pixels touched by the outline, and denote the area covered by the outline by A, where A is the number of pixels covered by a rectangle with sides parallel to axes completely enclosing the outline, then computing a bi-level raster shape requires $K_1 L + K_2 A$ steps, where $K_1$ and $K_2$ are constants more or less independent of L and A. Computing a multi-level raster shape with I coverage levels using the methods shown above requires at least $(K_3 \times L \times I^{\frac{1}{2}}) + (K_4 \times A \times I)$ steps, where $K_3$ and $K_4$ are constants more or less independent of L, A and I. In view of the computational costs, and the limitations of computing hardware, an improved method for multi-level raster shape synthesis is needed.

SUMMARY OF THE INVENTION

An improved method and apparatus for synthesizing multi-level raster shapes directly from ideal shape descriptions is provided by virtue of the present invention.

One advantage of the present invention is that it reduces the computational expense of synthesizing a multi-level representation of an ideal shape to orders of magnitude similar to that of synthesizing a bi-level representation of that ideal shape.

Direct multi-level filling is the name given to the method for synthesizing multi-level raster shapes described herein. According to one embodiment of the method of the invention, a raster shape suitable for approximating the ideal shape on a raster display device is synthesized by dividing a region of two-dimensional space representing part of the display surface into a plurality of pixel areas according to a pixel grid, representing the shape as one or more arcs in the two-dimensional space, where the arcs, when considered together and interpreted according to an insideness criterion, divide the two-dimensional space into at least one inside area and at least one outside area, and separating the pixels into inside pixels, outside pixels, and boundary pixels. The raster shape comprises coverage values assigned to each pixel in the region, where inside pixels are assigned an coverage value of 1, the outside pixels are assigned an coverage value of 0 and the boundary pixels are assigned a value between 0 and 1.

In one method according to the present invention, boundary pixels are initially assigned a coverage value of either 0 or 1, according to a pixel-coverage criterium, and then a correction value is computed which adjusts the initial coverage value to a value between 0 and 1. When the correction value is computed properly, the corrected coverage value for a boundary pixel is the same regardless of the pixel-coverage criterium used to initially assign a coverage value to the boundary pixel.

In some embodiments, the correction value for a pixel is the fraction of the surface area of the pixel covered by a correction region. In alternate embodiments, the correction value is an approximation to this fraction found by determining what fraction of a set of sample points distributed throughout the pixel surface fall within the correction region. In some embodiments, the sample points are counted using various methods with their attendant precisions and computational costs. Some methods favor efficiency over accuracy, while other methods provide more accurate results with lower efficiency.

The present invention improves considerably on the $(K_3 \times L \times I^{\frac{1}{2}}) + (K_4 \times A \times I)$ computation steps required by the traditional method for computing multi-level raster shapes. In one embodiment, it requires $(K_5 \times L) + (K_6 \times A)$ steps, which is a number of steps independent of the number of coverage levels desired, I, and essentially the same number of steps required to compute a bi-level raster shape of the same size. In another embodiment, the method requires $(K_7 \times L \times I)$ $(K_8 \times A)$ steps. $K_{5-8}$ are constants more or less independent of the size of the outline or the resolution of the pixels. While this number of steps is not independent of the number of coverage levels, it still represents a substantial improvement over the prior art for two reasons. The first is that the complexity of the method is proportional only to $(L \times I)$, instead of $(A \times I)$ as in the prior art methods. This difference can be highly significant, particularly for shapes covering many pixels, because A grows proportionally to $L^2$ for all common outlines. The second reason is that when the number of samples is small, careful implementation techniques make the constant of proportionality $K_7$ very small, so that the practical impact of the dependence on I is insignificant.

According to one method according to the present invention, a bi-level raster shape of the same size as the desired multi-level shape is computed, the boundary pixels are identified and then the coverage values for the boundary pixels are refined. The efficiency of such a method is a result of treating boundary pixels as special cases, thus eliminating the cost of multi-level refinement of coverage values for pixels which are completely inside or completely outside the outline.

A further understanding of the nature and advantages of the inventions herein may be realized by reference to the remaining portions of the specification and the attached drawings.

BRIEF DESCRIPTION OF THE DRAWINGS

FIG. 8 including FIGS. 8a–8a.1 to 8c–8c.1 is an illustration of several ideal shapes defined by outlines (a)-(e) and the inside region they define under two common insideness criteria;

DESCRIPTION OF THE PREFERRED EMBODIMENTS

Figure 1:
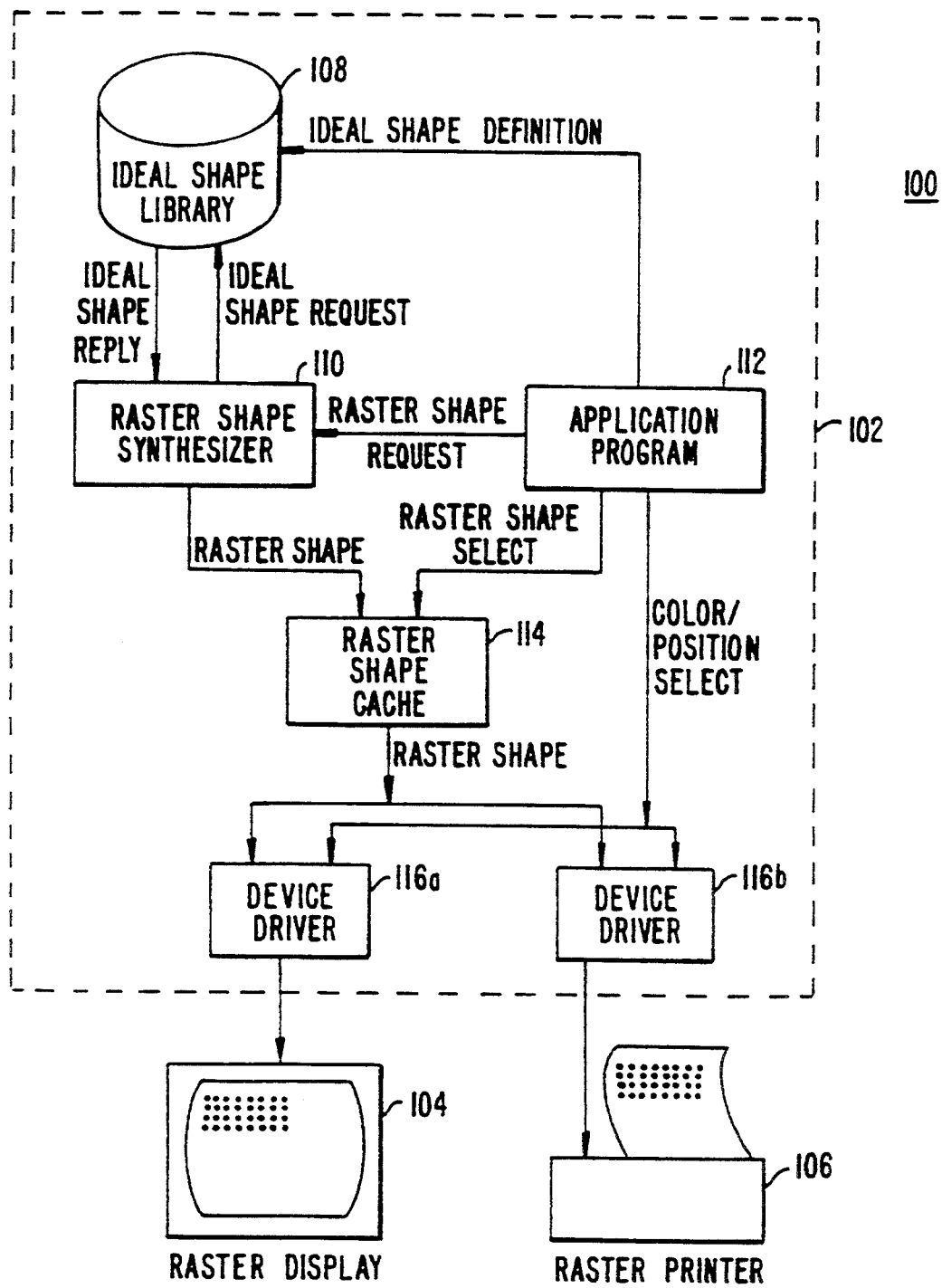
FIG. 1 is a block diagram of a computer system which uses a raster shape synthesizer to synthesize raster shapes from ideal shapes for display on raster display devices.

FIG. 1 is a block diagram of an image display system 100. Image display system 100 comprises a digital computer 102, with a raster display 104, and a raster printer 106 coupled to accept output from computer 102. Computer 102 comprises a library of ideal shapes 108 which holds the analytic descriptions of the ideal shapes, raster shape synthesizer 110, an application program 112, a cache of raster shapes already synthesized 114, and output drivers 116a,b. Raster shape synthesizer 110 is coupled to receive outline descriptions from ideal shape library 108 and shape requests from application program 112. Application 112 is coupled to raster shape cache 114 and output drivers 116a, 116b. Raster shape cache 114 is also coupled to output drivers 116a and 116b. Output driver 116a interfaces with raster display 104, while output driver 116b interfaces with printer 106.

In one embodiment, application 112 may be a windowing system, word processor, desk-top publishing program, spreadsheet program or graphic display tool. The actual operation of application 112 is unimportant, except so far as it selects ideal shapes to be represented as raster shapes, causes raster shapes to be synthesized from ideal shapes, or causes raster shapes to be output to display 104 or printer 106. When application program 112 desires a shape to be displayed in a given color at a given position on the raster image of either display 104 or printer 106, it indicates the desired shape to raster shape cache 114, and the resulting raster shape is output to the output drivers. The color and position of the character are not needed to find the correct raster shape in the cache, and these parameters are passed directly to the output drivers. If raster shape cache 114 does not already contain the desired shape, application 112 causes raster shape synthesizer 110 to create the raster shape and place it into raster shape cache 114. Alternatively, raster shape cache 114 might include the necessary control means to request the synthesis of raster shapes as needed. In some embodiments, application program 112 is capable of generating new shape definitions to be stored in ideal shape library 108, while in other embodiments, a separate application program is required to modify ideal shape library 108.

In alternate embodiments, raster shape cache 114 might be eliminated altogether in favor of using raster shape synthesizer 110 to create raster shapes as they are needed. In some embodiments, the raster shapes are returned to the application program for further processing, in which case the raster shapes might be output from application 112 directly to the output drivers 116a, 116b.

Figure 2:
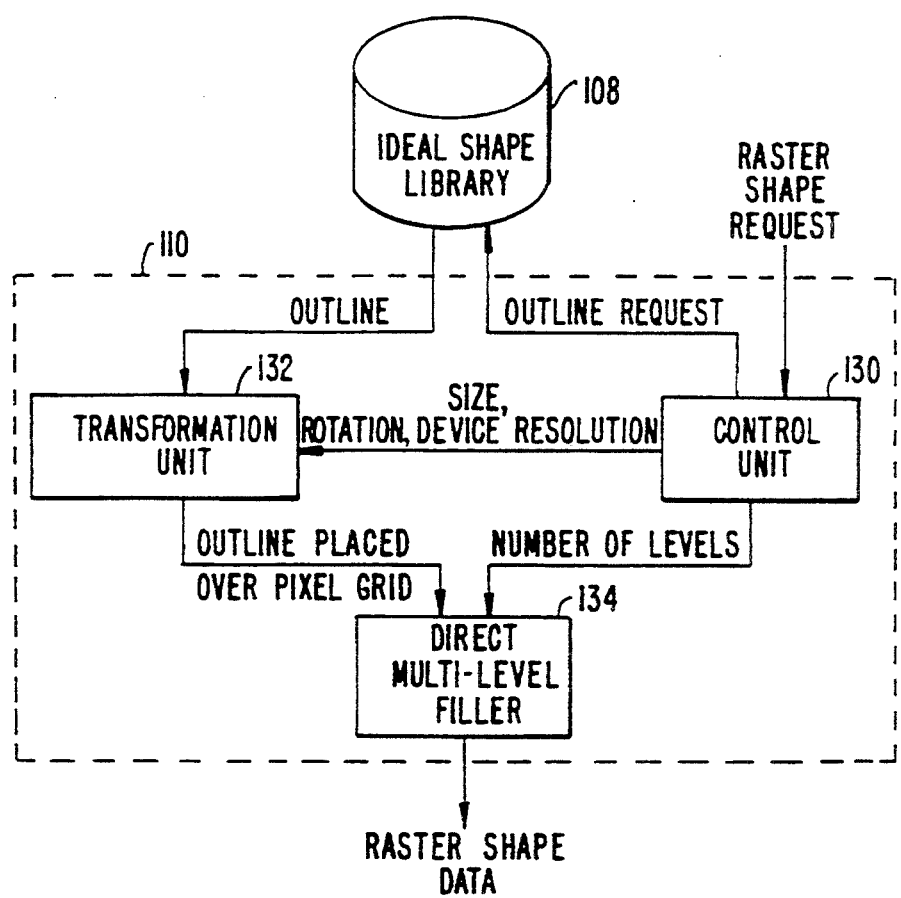
FIG. 2 is a block diagram of the raster shape synthesizer shown in FIG. 1.

FIG. 2 is a more detailed block diagram of raster shape synthesizer 110 coupled to library 108 shown in FIG. 1. Raster shape synthesizer 110 comprises a control unit 130, an outline transformation unit 132 and a direct multi-level filler 134. Control unit 130 receives raster shape requests from application program 112 (shown in FIG. 1). As an example of the operation of control unit 130, suppose a raster shape request is received for the letter "a" from a Courier font, with a point size of 12 points, rotated 45 degrees clockwise, with 16 different coverage levels for a device with 75 pixels per inch. Control unit 130 separates this information into a request for an ideal shape (e.g., the letter "a" from the Courier font) addressed to ideal shape library 108, and information used by transformation unit 132 (e.g., size is 12 points, device resolution is 75 pixels per inch, character must be rotated 45 degrees clockwise, etc.) Transformation unit 132 uses this information to modify the ideal shape to fit the request, usually by performing simple arithmetic operations on the numerical data defining the arcs which comprise the outline representing the ideal shape and positioning the result over a pixel grid which has the specified resolution. The new outline thus produced is passed on to direct multi-level filler 134 which produces the requested raster shape and outputs the raster shape to raster shape cache 114 (shown in FIG. 1).

Figure 5A:
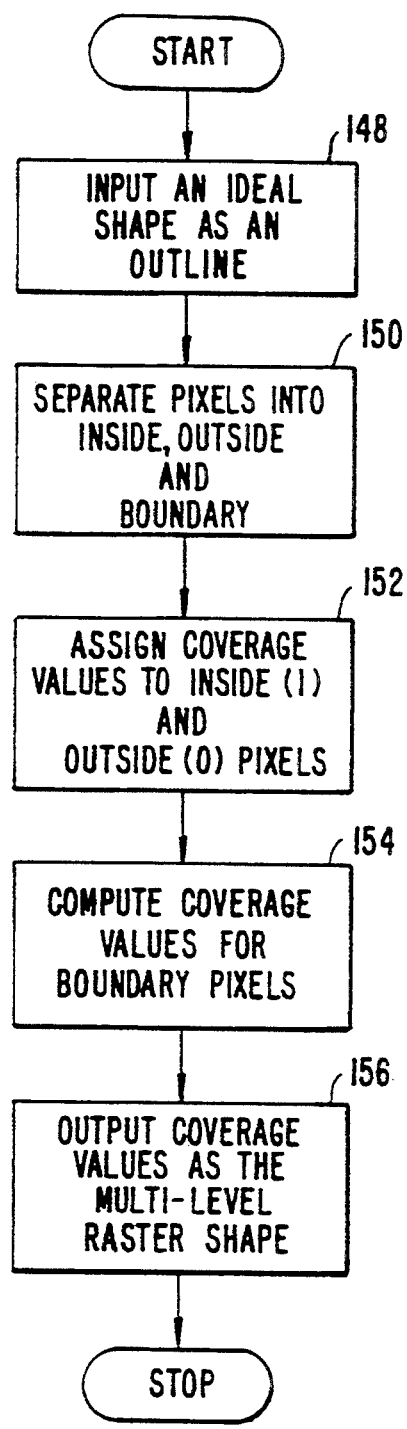
FIG. 5(a) is a flow chart of a direct multi-level filling process according to the present invention performed by a raster shape synthesizer.
Figure 5B:
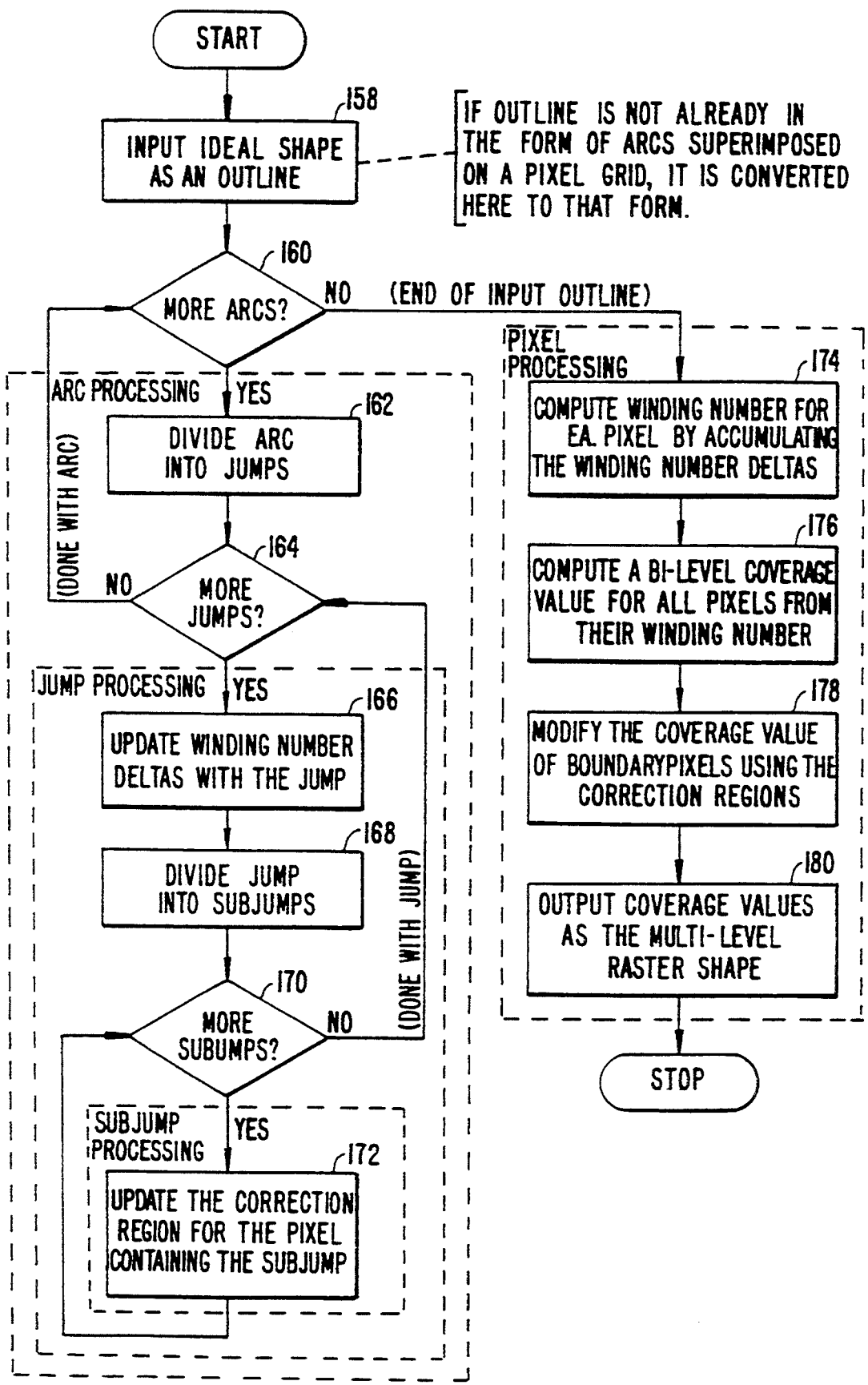
FIG. 5(b) is a more detailed flow chart of a direct multi-level filling process.

FIG. 5(a) is a highly abbreviated flow chart of a direct multi-level filling process according to the present invention used by direct multi-level fillers such as filler 134 (shown in FIG. 2) to convert the analytic representations of an outline and other parameters (e.g., number of levels desired) into a multi-level raster shape. A more detailed flowchart of a similar process is depicted in FIG. 5(b). The process starts with the input of an outline in block 148. As previously mentioned, this outline comprises one or more arcs defining the boundaries of the shape embodied by the outline.

Next, in block 150, pixels that may be affected by the outline are classified into three groups: inside pixels, outside pixels and boundary pixels. This computation is equivalent to computing a bi-level raster shape for the outline while keeping track of which pixels are crossed by the outline. The pixels crossed by the outline are the only pixels that may contain both inside and outside points and therefore are the only pixels which might be boundary pixels.

In block 152, coverage values are assigned to the inside and outside pixels.

In block 154, coverage values for boundary pixels are computed. While the computation of coverage values in block 154 may be costly in some embodiments, it should be apparent that this computation is only necessary for boundary pixels.

Consider now the flowchart of FIG. 5(b). The operations in blocks 158–172 represent the analysis of the input outline and the collection of relevant data, corresponding roughly to block 150 of the method shown in FIG. 5(a). The operations in blocks 174–176 correspond roughly to block 152 of the method shown in FIG. 5(a), in which the coverage values of inside and outside pixels are determined. Finally the operations in block 178, which require results of the computation of correction regions performed in block 172, correspond roughly to block 154 of the method shown in FIG. 5(a), in which the coverage values of boundary pixels are computed. The operations performed in the blocks of FIG. 5(b) will now be described in further detail.

At block 158, a direct multi-level filler receives an outline comprising arcs superimposed on a pixel grid.

Figure 3A:
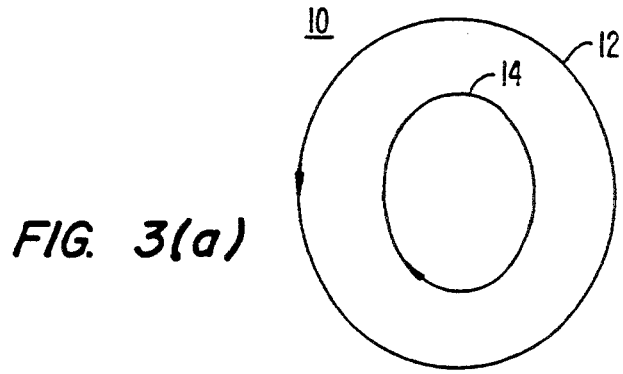
FIG. 3(a) is an illustration of a shape outline.
Figure 3B:
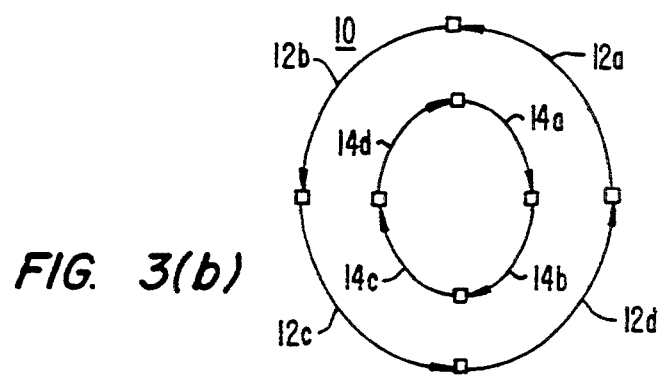
FIG. 3(b) is an illustration of arc components of the shape outline shown in FIG. 3(a)
Figure 4A:
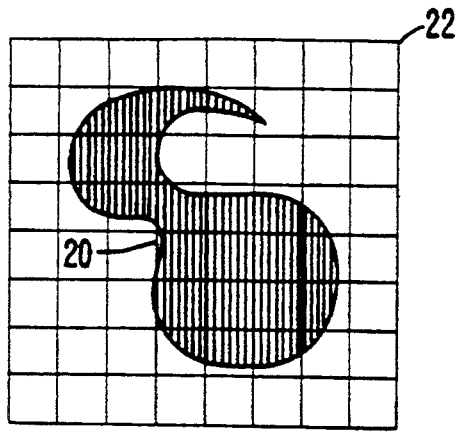
FIGS. 4(a)-(f) are illustrations of various ways of representing an ideal shape in a pixel grid.
Figure 4B:
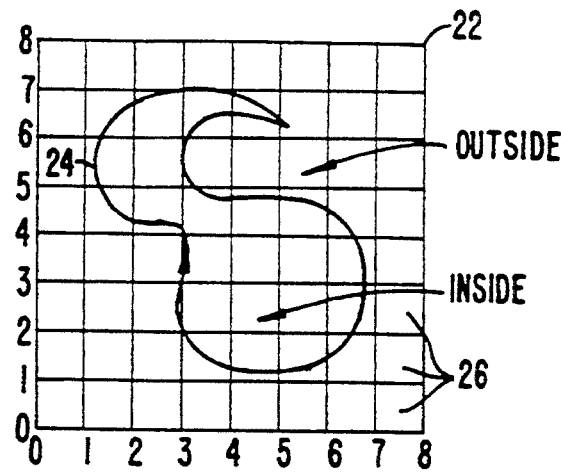
Figure 4C:
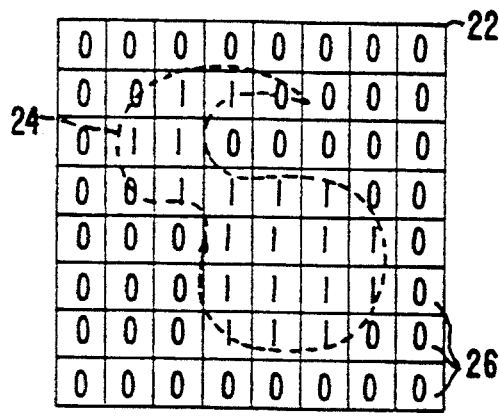
Figure 4D:
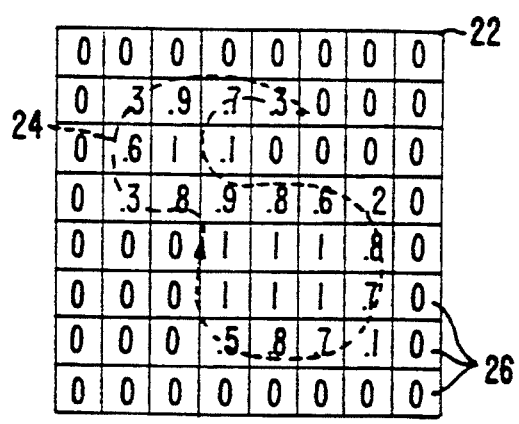
Figure 4E:
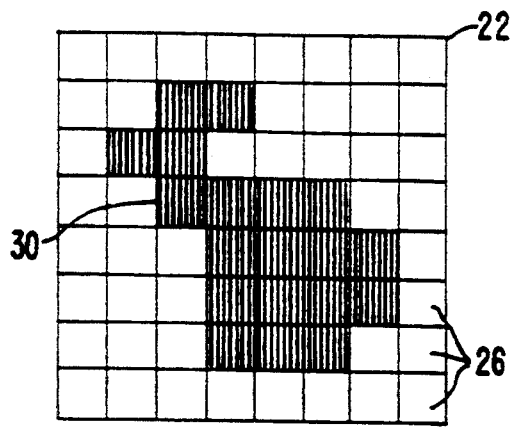
Figure 4F:
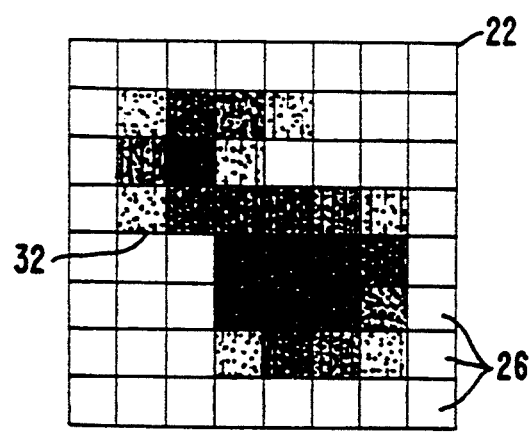

In block 160, the filler begins processing an outline in the form of arc formulae one arc at a time. An example of an outline broken down into its constituent arcs is outline 10 shown in FIG. 3(b); outline 10 might be used to synthesize a raster shape for the character "o" in a particular font. One way in which each of the eight arcs shown (12a–d, 14a–d) might be represented when input to the filler is by two parametric equations, x(t) and y(t). Using the parametric equations, (x(0), y(0)) describes an arc's starting point, (x(1), y(1)) describes the arc's ending point, and (x(t), y(t)) for $0 < t < 1$ describes all the points comprising the arc between the starting point and the ending point. To minimize the amount of computation needed to synthesize a raster shape, x(t) and y(t) are typically small-degree polynomials of t. In some embodiments, transformation unit 132 (FIG. 2) has fixed the parametric equations relative to the pixel space so that a raster shape will have the desired orientation and size in pixels. For example, suppose that the outline data for an ideal shape is stored in a library of ideal shapes using a convention that assigns the shape an arbitrary size of 1000 units and a request is received by a raster shape synthesizer (such as synthesizer 110 shown in FIG. 1) to display the ideal shape at a size of 0.25" in a display device with a resolution of 100 pixels per inch. Because the 0.25" size translates into 25 pixels for such a raster device, the ideal outline would have to be scaled by a factor of 1/40 so that the units of the result correspond to pixels. The data would also be translated so that it overlays a pixel grid of appropriate size to include all the pixels that may be affected by the scaled outline. FIG. 4(b) shows such an outline completely enclosed in a box of 64 pixels. A person of ordinary skill in the art of computer graphic programming would know of various numerical representations of arcs as well as methods of scaling, translating and rotating ideal shapes represented as outlines comprising such arcs.

Referring again to FIG. 5(b), block 162 serializes the arcs of the outline, so that they are processed one at a time. While FIG. 5(b) shows each arc processed one at a time, with jump processing occurring one jump at a time for each jump derived from an arc, and with subjump processing occurring one subjump at a time for each subjump comprising a jump, followed by processing on a pixel-by-pixel basis, the processes shown, in some embodiments are performed in a different order. For example, in alternate embodiments, parallel processing might be used, or a process order where all the arcs are processed into jumps, all the jumps are processed into subjumps, and then the collection of subjumps is processed, followed by the pixel processing.

In block 162, each arc is converted into a sequence of "jumps". Jumps are small, straight line segments which collectively approximate the arc. The collection of jumps from all the arcs of an outline is called a "trace" of the outline.

Figure 6A:
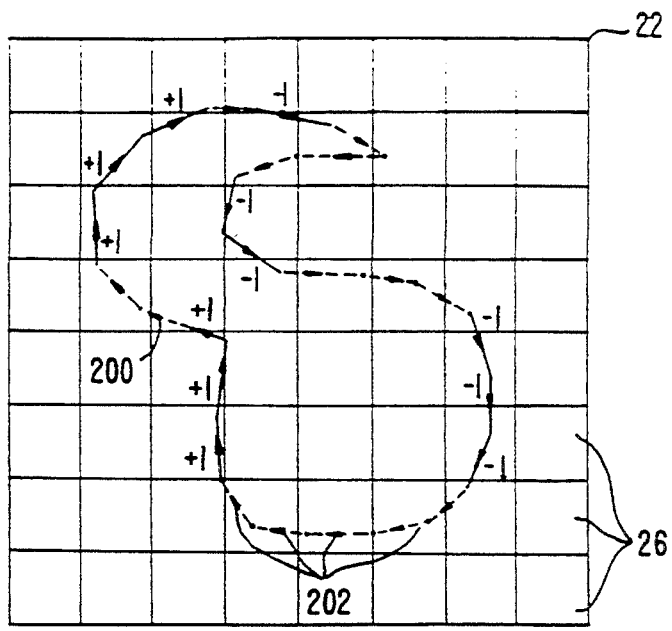
FIG. 6(a) is an illustration of a trace derived from an outline superimposed on a pixel grid, highlighting the jumps of the trace which contribute to winding number deltas.

FIG. 6(a) shows a trace 200 and its constituent jumps 202. The difference between the dim and bold jumps in FIG. 6(a) will be explained later in connection with block 166 of FIG. 5(b). The computation of a trace, that is, the decomposition of each arc of an outline into jumps, will also be a well known operation to a person of ordinary skill in the art of computer graphics.

Many different traces for a given outline can be generated and used in the direct multi-level filling process, and the size of the jumps may vary. Generally, the smaller the jumps are, the better the trace approximates the outline, but more jumps are required for a given outline. Thus, smaller jumps are more precise but require more computation to generate and process. In some embodiments, of a direct multi-level filling method, a useful compromise between the competing requirements of precision and cost is to keep the dimensions of the longest jump measured horizontally and vertically (i.e., projections onto the pixel axes) to less than a fixed length and to insure that the average dimensions of the jumps are no less than a certain fraction 1/K of a pixel, for some relatively small value of K. This compromise can be achieved by exercising appropriate care during the process of decomposing an arc into jumps in block 162. Although it is not essential for the correct operation of the method being described, in the remainder of our description, the maximum length of each jump will be assumed to be less than the length of one pixel and the total number of jumps will be assumed to be no more than a small constant multiplied by the length of the outline measured in pixels.

Referring again to FIG. 5(b), in block 164, the filler serializes the jumps so that one jump at a time is processed in blocks 166 and 168. In block 166, "winding number deltas" are calculated for each pixel. The winding number deltas are the numbers associated with the upper edges of pixels as shown in pixel grid 22 in FIG. 6(*b*). As will be explained below, winding number deltas are relevant to determining bi-level coverage values for the pixels.

Figure 6B:
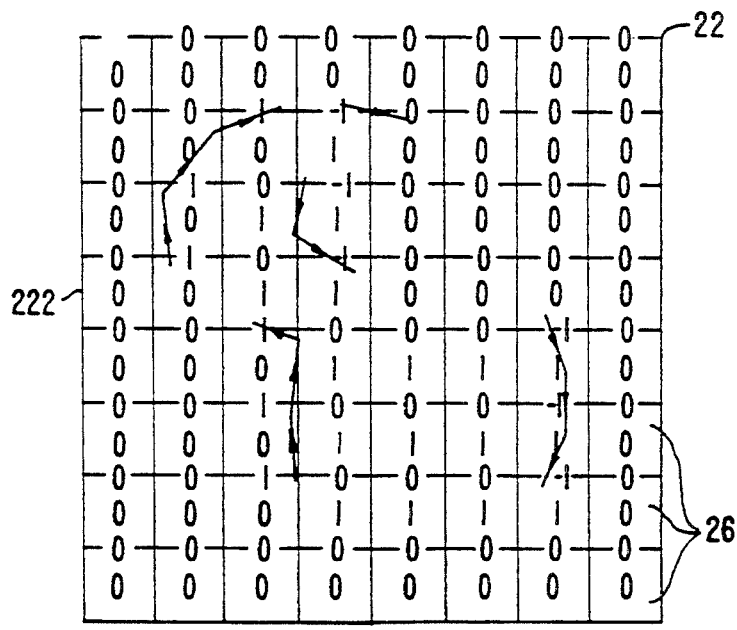
FIG. 6(b) is an illustration of a trace superimposed on a pixel grid showing the contribution of the jumps to winding number delta values and the pixel winding numbers found by accumulating winding number deltas.

The value of the winding number delta associated with a pixel's edge depends on the jumps which cross the upper edge of the pixel: if no jumps cross the upper edge, the winding number delta for the edge is 0. Each jump which crosses an edge contributes either −1 or +1 to the winding number delta of that edge. The sign of the jump's contribution depends on the orientation of the jump: jumps that cross the edge from bottom to top contribute +1 and those that cross from top to bottom contribute −1. The bold jumps shown in FIG. 6(*a*) are those that cross the upper edge of some pixel and therefore contribute to some winding number delta (the winding number delta of the edge crossed), while the faint ones do not. The contribution of each bold jump is shown next to the jump. In FIG. 6(*b*), the winding number deltas produced by the jumps of FIG. 6(*a*) are shown associated to the upper edge of each pixel. The meaning of the numbers shown in the center of pixels in FIG. 6(*b*) is explained below.

Figure 7:
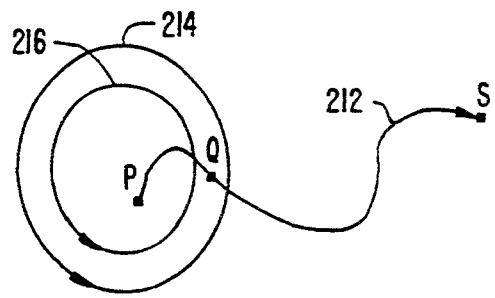
FIG. 7 is an illustration of an outline, a point within the outline, an exit trajectory from the point to a sink point, and an intermediate point in the exit trajectory between the inside point and the sink point.

FIG. 7 illustrates the concept of the winding number of a point, which will now be described. FIG. 7 shows a point P, a sink point S, an exit trajectory 212 running from point P to sink point S, and an outline comprising two contours 214, 216. While the description of the winding number of point P will use exit trajectory 212 and sink point S, the result does not depend on the choice of sink point and exit trajectory as will become apparent. All that is required is that sink point S be outside the outline and far enough away from it to avoid ambiguities.

To find the winding number of point P, simply start at point P with a count of zero and follow exit trajectory 212, incrementing the count by one when a contour crosses exit trajectory 212 from left to right and decrementing the count by one when a contour crosses from right to left. The final count when sink point S is reached is the winding number for point P. In FIG. 7, the winding number of the point P is −2, since both contours 214, 216 cross exit trajectory 212 from right to left. It should be apparent that for any exit trajectory and any sink point outside contours 214 and 216, the net count will also be −2.

The inside and outside regions defined by an arbitrary outline are customarily defined by applying an "insideness criterium" to the winding number of points. One commonly used insideness criterium, usually called the "parity" insideness criterium or the "odd-even" insideness criterium, considers all the points with an odd winding number to be inside the outline. Another commonly used insideness criterium, called the "non-zero" criterium, considers all points with a non-zero winding number to be inside the outline.

FIG. 8 shows several outlines (*a*)–(*e*) with the inside regions determined by each insideness criterium. Both parity and non-zero are used in practice in conjunction with outlines to define shapes and any practical method to synthesize raster shapes must be capable of using either insideness criterium.

FIG. 7 also depicts a second point Q along the exit trajectory to illustrate that the winding numbers of points may be computed incrementally. If we know the winding number of Q and want to compute the winding number of P, we only needed to compute the difference between the two numbers by performing the counting process described above on an arbitrary trajectory from P to Q and add the winding number of Q to the result. The difference between the winding numbers of points P and Q is what we have called a winding number delta.

Returning to FIG. 5(*b*), the incremental computation of the winding number just described in connection to FIG. 7 is an efficient way of computing the winding number of the upper left corner of each pixel. Because the choice of exit trajectories is arbitrary, they can be chosen for computational efficiency as horizontal line segments starting at the upper left corner of a pixel for which a winding number is to be determined, and proceeding left from the corner to the edge of pixel grid 22. As pixel grid 22, when properly selected, envelopes the outline, any point on the edge of pixel grid 22 is a suitable sink point. As explained earlier, the choice of exit trajectory is purely a matter of choice; horizontal lines have been chosen to simplify computation, but any other choice would work equally well. The winding number deltas computed in block 166 and associated with the upper edge of pixels, as shown in FIG. 6(*b*), are in fact the differences between the winding numbers of the upper left corners of horizontally adjacent pixels. It therefore follows that accumulating the winding number deltas from left to right horizontally, as prescribed in block 174, will produce the winding numbers of the upper left corners of each pixel in pixel grid 22. As an example, each of the numbers in the center of a pixels shown in FIG. 6(*b*) is the winding number resulting from accumulating the winding number deltas associated with the top edges of pixels to the left of the pixel.

Figure 9A:
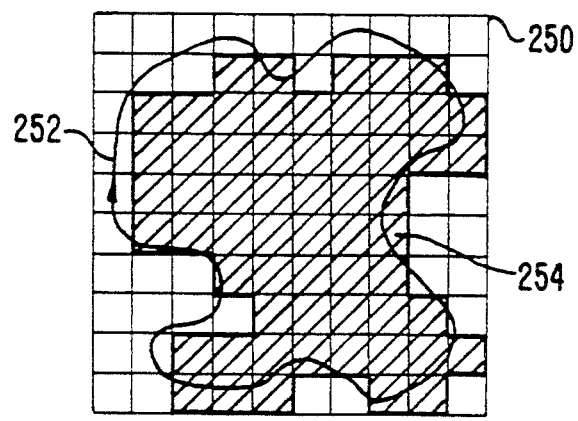
FIG. 9(a) is an illustration of a bi-level raster shape approximating the inside of a contour superimposed on a pixel grid.

In block 176, the filler applies the appropriate insideness criterium to the winding numbers computed in block 174 to produce a bi-level raster shape using the "upper left corner containment" criterium for classifying boundary pixels into inside or outside pixels. This bi-level raster shape is an approximation to the multi-level raster shape desired as shown in FIGS. 9(*a*)–(*c*). FIG. 9(*a*) shows an outline 252 enclosed by a pixel grid 250 and a bi-level raster shape 254 produced from outline 252 using the "upper left corner containment" pixel-coverage criterium. Raster shape 254 is produced by the filler when outline 252 is input in block 158. FIGS. 9(*b*)–(*c*) show the errors committed by this approximation. FIG. 9(*b*) shows boundary pixels, such as pixels 256, that the bi-level raster shape approximation considers to be outside and FIG. 9(*c*) shows boundary pixels, such as pixels 258, that the approximation considers to be inside. It should be noted that the approximation is exact for all pixels except those touched by the outline itself. As a result, the filler need only address coverage value corrections of the boundary pixels produced by the bi-level approximation.

Figure 9B:
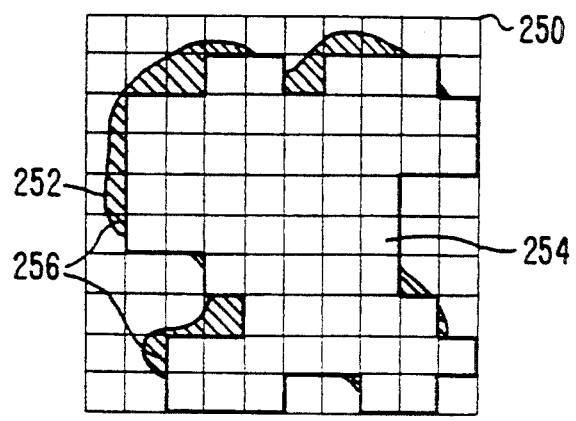
FIG. 9(b) is an illustration of the regions that are underestimated by the bi-level raster shape shown in FIG. 9(a)
Figure 9C:
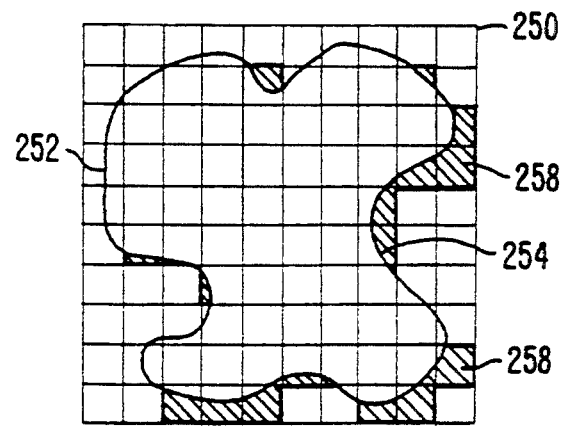
FIG. 9(c) is an illustration of the regions that are overestimated by the bi-level raster shape shown in FIG. 9(a)

The filler in blocks 168, 170, 172, and 178 (shown in FIG. 5(*b*)) performs this correction by means that will now be described. Boundary pixels are the only pixels, by definition, that might contain regions that are inside the outline and regions that are outside. The regions that are on the same side (inside or outside) as the upper left corner of the pixel (when the "upper left corner containment" pixel-coverage criterium is used) are called collectively the "correct region" because the bi-level coverage value assigned to the pixel in block 176 describes correctly whether the region is inside or outside the outline. The remainder regions are called collectively the "correction region" and they represent the error committed by the bi-level approximation on that pixel. The shaded areas of FIGS. 9(b)–(c) are correction regions.

The filler computes the correction regions and then from each of them it computes a correction value. It then uses the correction values to adjust the bi-level coverage values of the boundary pixels computed in block 176 thereby reducing or eliminating the estimation error of the bi-level raster shape. The computation of the correction region is performed in block 172 and the correction value for the correction region is translated into a correction value in block 178. The correction values are used to adjust coverage values for the boundary pixels.

The filler, in blocks 168, 170 and 172, determines the correction region of each boundary pixel by accumulating the contributions of primitive elements called subjumps into which the outline is decomposed.

Figure 10A:
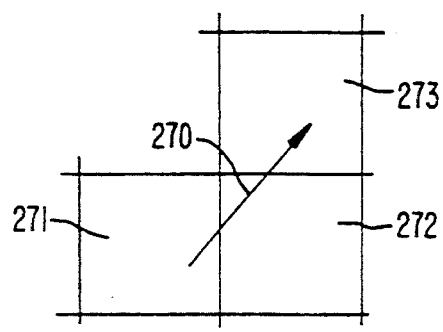
FIGS. 10(a)-(b) show the decomposition of a jump into subjumps, with each subjump contained entirely within a pixel.
Figure 10B:
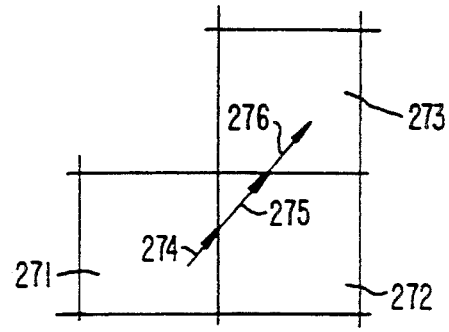

FIGS. 10(a) and (b) show how a jump is divided into subjumps, as is done in block 168. A jump is divided into pieces, or subjumps, which are confined to a single pixel. FIG. 10(a) shows a jump 270 which touches pixels 271, 272 and 273. FIG. 10(b) shows the decomposition of jump 270 into subjumps 274, 275 and 276 so that the vector addition of the subjumps equals the jump and each subjump is contained entirely within a pixel: subjump 274 in pixel 271, subjump 275 in pixel 272 and subjump 276 in pixel 273. In block 170, subjumps are serialized, so that they may be processed individually in block 172.

Figure 11A:
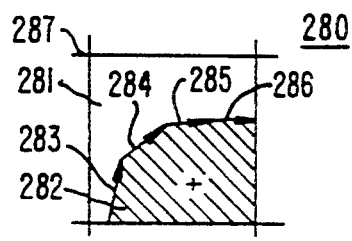
FIGS. 11(a)-(d) show the various correction regions contributed by various subjumps.
Figure 11B:
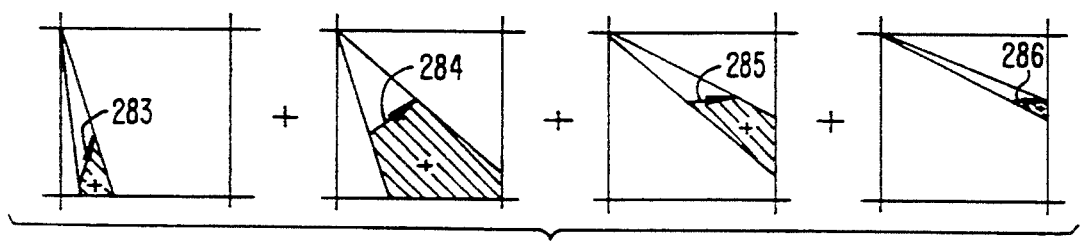

One method of determining correction region updates in block 172 will now be described with reference to FIGS. 11(a)–(d). FIG. 11(a) shows a pixel 280 divided into a correct area 281 and a correction area 282 separated by subjumps 283,284, 285, and 286. The contributions of the individual subjumps to the correction region are shown as signed regions in FIG. 11(b). The regions are computed by reference to an "subjump winding number delta." The subjump winding number delta of a point is computed by the process illustrated in FIG. 7 using as the trajectory a straight line from the point to the upper left corner of the pixel that contains it and considering only intersections with the subjump in question. It should be apparent that a given subjump can only produce subjump winding number delta values for a given point in either the set $\{0, +1\}$ or in the set $\{0, -1\}$ This is because the trajectory from a point of a pixel to the upper left corner of the pixel can intersect a given subjump at most once, so the magnitude of the subjump winding number delta for any point is at most one. The subjump winding numbers for all the points in a pixel will therefore be in the set $\{0, -1, 1\}$. Furthermore, all the points with a non-zero subjump winding number relative to a given subjump will have the same sign because the relative directions of the subjump and the trajectory from such a point to the upper left corner will be the same for all the points. The set is therefore split into either $\{0, -1\}$ or $\{0, 1\}$.

The contribution of a subjump is the collection of points that have non-zero subjump winding number deltas for that subjump and the sign of the region is the sign of the subjump winding number delta of any point in the contribution. The correction region for a pixel can then be calculated by aggregating the signed regions contributed by all the subjumps that fall within the pixel.

Figure 11C:
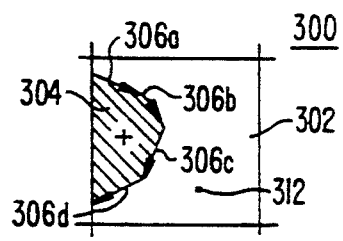
Figure 11D:
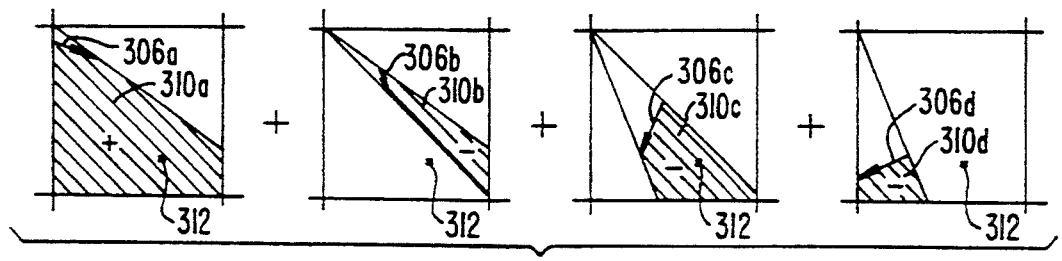

A more involved example of the computation of the correction region of a pixel is given in FIGS. 11(c)–(d).

FIG. 11(c) shows a pixel 300 with correct region 302 containing point 312, and correction region 304 defined by four subjumps 306a–d. Subjumps 306a–d are shown individually in FIG. 11(d) with their contributions. Point 312 belongs to the contribution 310a of subjump 306a and also to contribution 310c of subjump 306c. Because these contributions have opposite signs, the regions that they have in common cancel each other out leaving point 312 outside of the correction region 304.

The actual information gathered in block 172 differs from embodiment to embodiment. In one of the simplest methods, the "surface area" method, the contribution of a subjump to a correction value is a signed number representing the surface area of the region it contributes with a sign dependent on the orientation of the subjump. These numbers are accumulated separately for each boundary pixel in step 172, so that when all subjumps have been processed, the correction value associated with a boundary pixel measures the surface area of the correction region.

Figure 12:
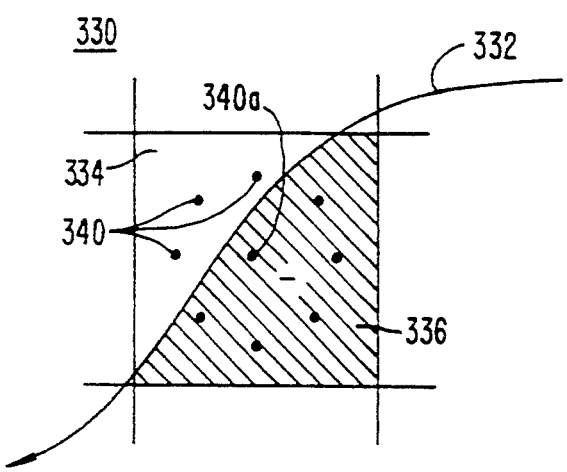
FIG. 12 is an illustration of the sample counting method for valuing a correction region.

Another intuitive method of valuing the contribution of each subjump is the "sample counting" method. This method is illustrated in FIG. 12, which shows boundary pixel 330 divided by contour 332 into a correct region 334 and a correction region 336. FIG. 12 also shows a set of sample points 340 distributed around the surface of pixel 330. The contribution of a subjump to the correction value for pixel 330 in this method is equal to the number of samples included in the region contributed to the correction region by the subjump, normalized by the total number of samples in the pixel. By accumulating the signed subjump contributions thus computed, the result is a number for every boundary pixel that measures the total number of samples in the correction region for the pixel divided by the total number of samples in the pixel.

A straightforward generalization of the sample counting method assigns each sample point 340 a weight, thereby allowing different sample points to contribute in different measures to the final correction value. For example, points near the center of the pixel may contribute more heavily than those near the edges. The contribution of a subjump in this case is a number obtained by adding up the weights of the sample points inside the region contributed by the subjump and divided by the sum of the weights of all the sample points in the pixel.

When the surface area or sample counting method is used in block 172 (referring back to FIG. 5(b)), they produce a single number, a correction value, C, per boundary pixel. The correction value must be between $+1$ and $-1$ and its absolute value estimates the correction region as a fraction of the area of the pixel. In block 178, for each boundary pixel, a winding number, W, of the upper left corner of the boundary pixel and a correction value for the pixel, C, which was computed in block 172, are used together with the insideness criterium to compute the coverage value of the pixel. One way in which this task can be performed is as follows. Applying the insideness criterium being used to W provides an indication of whether the upper left corner of the pixel is inside or outside the outline, and applying the same insideness criterium to $W+\text{sign}(C)$ provides an indication of whether the correction region is inside or outside the outline. If both the upper left corner and the correction region are inside the outline, the coverage value for the pixel is 1. Otherwise, if the upper left corner of the pixel is outside (and therefore, the correction region is inside), the coverage value for the pixel is the absolute value of C. If the upper left corner of the pixel is inside (and therefore, the correction region is outside), the coverage value is 1 minus the absolute value of C.

Figure 13:
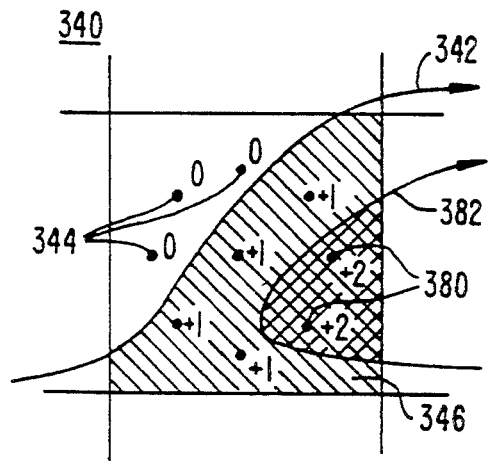
FIG. 13 is an illustration of a pixel which is crossed by two contours with the same orientation and how it affects the evaluation of a correction region.

The surface area and sample counting methods—indeed all methods of estimating correction regions that do not maintain geometric information about the correction region—may produce incorrect results in some cases. One of these cases is illustrated in FIG. 13, which shows pixel 340 touched by two contours 342 and 382. Using the methods just described, it should be apparent that the region of pixel 340 enclosed by contour 382 will contribute twice to the correction region 346. It should also be apparent that this contribution would be incorrect, since the "coverage" of a point by an outline should either be "covered once" or "not covered", but never "covered twice". For example, if the upper left corner of pixel 340 is assumed to be outside the outline, then the region enclosed by contour 382 would be also outside if the parity insideness criterium being used, in which case it should not be counted at all, and it would be inside if the non-zero insideness criterium being used, in which case it should be counted only once.

Two natural questions arise from this example. Under what conditions can the surface area and sample counting methods be guaranteed to work correctly, and whether a more careful (and perhaps costlier) method of estimating the correction region can be guaranteed to work correctly for all outlines? These two questions are answered below.

A set of sufficient conditions to guarantee the correctness of the surface area and sample counting methods for determining coverage values of an outline on pixels are the following:
1. All contours of the outline must be free from self-intersections. This implies that each contour will have a well-defined direction, either clockwise or counterclockwise.
2. The contours must form a hierarchy, that is, two contours must be either disjoint or one must be completely inside the other. The hierarchy condition implies that a contour is either an outermost contour (if it is inside no other contour) or it has a parent contour (the innermost contour that encloses it).
3. A contour which is not an outermost contour must have the opposite direction to that of its parent contour.

Outlines which satisfy the first two of these conditions are called "intersection-free" outlines and those that satisfy all three conditions are called "well-formed" outlines. Of the examples given in FIG. 8 only (a) is well-formed, and only (a) and (b) are intersection-free. This is not, however, representative of practical cases, in which well-formed outlines are the vast majority. For example, most formats used to express outline font data require that the character shapes be described by a well-formed outline. Surface area and sample counting can therefore be used to compute the multi-level raster shapes of character shapes with complete confidence.

Estimating the correction region by the accumulation of subjump contributions while avoiding the multiple counting problem discussed in connection with FIG. 13 above, is possible by maintaining some geometric information about which points are covered in a particular subjump contribution region. The information kept about each boundary pixel must be enough to tell at any given point in the accumulation not just how much of the pixel is in the correction region, but also which part of the pixel is in the region. That way, if the inclusion of a given region is tracked, when another subjump calls for its inclusion again, the double inclusion can be avoided.

One correction region valuation method which maintains geometric information is the "value-per-sample" method, which will be described presently with reference to FIG. 13. Like the sample counting method, the value-per-sample method uses a number of sample points spread over the surface of a pixel, such as pixel 340, and maintains an independent "local winding number" for each sample point. Local winding numbers are shown next to each sample point in FIG. 13. The local winding numbers computed have the usual interpretation using as the exit trajectory a straight line from the sample point to the upper left corner of pixel 340.

The computation performed in block 172 when using the value per sample method therefore comprises aggregating separately for each sample point the local subjump winding number deltas produced by individual subjumps as depicted in FIGS. 11(a)-(d). The result of this aggregation when all the subjumps have been processed is a local winding number for each sample point of each boundary pixel. If the local winding number of a sample point is N, and the (global) winding number of the upper left corner of the pixel containing the sample is W, then the insideness criterium applied to $N+W$ indicates whether the sample point is inside or outside the outline. The computation in block 178, when using the value-per-sample method, uses this process to determine whether each sample point is inside or outside the outline independently and then translates this knowledge into an coverage value for each boundary pixel.

Returning to FIG. 13 as an example, if the winding number of the upper left corner is 0 and the parity insideness criterium is used, only the sample points with odd local winding numbers will be considered inside, producing an coverage value of 4/9 for pixel 340 assuming that all sample points 344 are weighted equally. If the non-zero insideness criterium is used, then the sample points with local winding numbers different from zero would have been inside, producing an coverage value of 6/9. If the winding number of the upper left corner is 1 and the parity insideness criterium is used, the coverage value is 5/9, as only sample points with even local winding numbers are considered to be inside the outline.

The computation required by the value-per-sample method is considerably greater than that required by the surface area or sample counting methods. In particular, the local winding numbers of many samples may have to be changed every time a subjump is processed, where one addition suffices for the other methods. The computation in block 178 is also more onerous with the value-per-sample method, as each sample point of a boundary pixel must be examined separately before a correction value is computed for the pixel. In exchange for the added computation, which comprises a number of steps proportional to $(L \times I)$, the value per sample method produces more accurate coverage values for arbitrary outlines.

While the raster shape synthesis methods just described require asymptotically fewer operations than methods in use today, some of the operations it requires appear to be complex. In particular, the division of jumps into subjumps and the computation of the contributions of individual subjumps to the correction region (regardless of which method is used) are relatively complex operations which appear to require computing line intersections and other geometric manipulations. These apparently complex computations can be simplified greatly by precomputing the results and looking them up when they are needed. This approach requires that the number of possible situations to be evaluated be reasonably small, which in this case means restricting the number of possible jumps. One means for limiting the number of possible jumps is to (i) limit the maximum length of a jump so that its projections on the pixel axes are less than a pixel in length and (ii) restrict the jumps to begin and end at subgrid points.

Figure 14A:
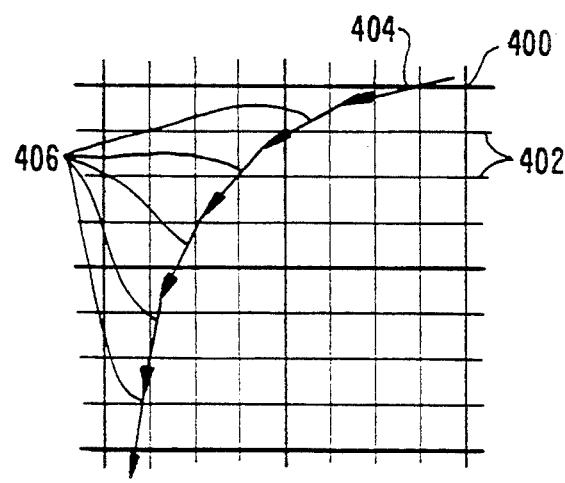
FIG. 14(a) illustrates a trace comprising jumps which are unconstrained to start and end at grid points of a subpixel grid.
Figure 14B:
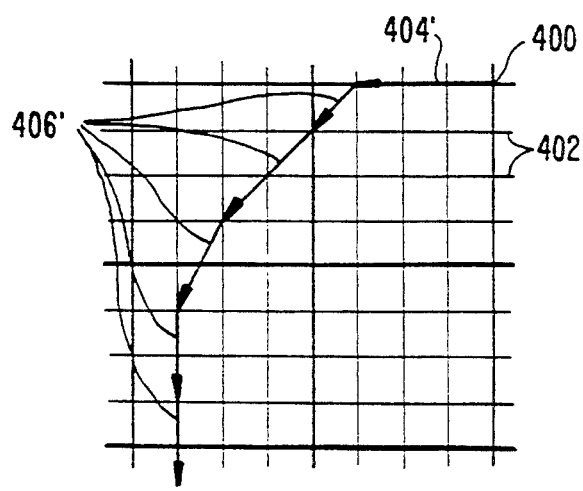
FIG. 14(b) shows a trace comprising jumps which are constrained to start and end at grid points of a sub pixel grid.

This is illustrated in FIGS. 14(a)-(b), where a pixel grid 400 and a subpixel grid 402 of higher resolution are overlaid by trace 404 comprising jumps such as jumps 406. FIG. 14(b) shows pixel grid 400 and subpixel grid 402, overlaid with an alternate trace 404' comprising jumps 406', which are constrained to begin and end at subgrid points of subpixel grid 402. While trace 404' is less precise, it makes the total number of possible jumps finite. In fact, it makes the possible ways in which a jump may interact with the pixels it touches also finite, since the position of the initial point of the jump relative to the pixel in which it starts must be one of the subgrid points.

Figure 15A:
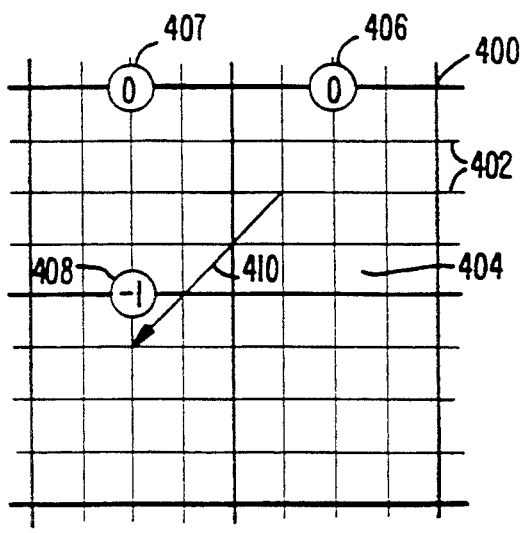
FIGS. 15(a)-(b) are illustrations of the information that needs to be stored or computed for each jump during a direct multi-level filling process.
Figure 15B:
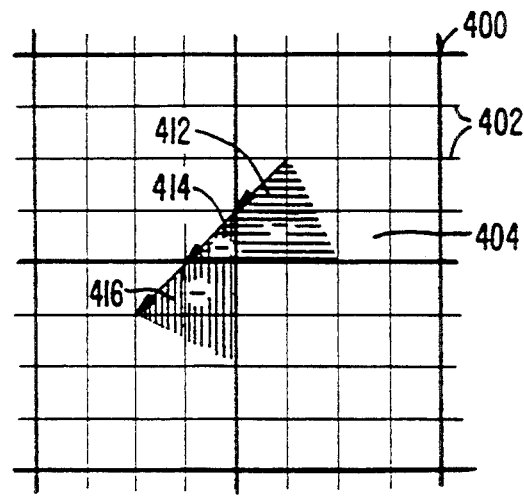

The finite number of possibilities allows the precomputation of the contributions for all possible jumps into a table of values. Then the operations specified in blocks 166, 168 and 172 of the flowchart in FIG. 5(b) become a matter of looking up certain values in the table and performing a few additions. The nature of a table containing the necessary information can be explained by reference to FIGS. 15(a)-(b). FIG. 15(a) depicts a pixel grid 400, a subpixel grid 402 and a jump 410 defined by a subpixel vector $(-3, -3)$ beginning at subpixel position (1, 2) of pixel 404. The table must have an entry for every possible combination of starting position and subpixel vector. The entry for vector $(-3, -3)$ with starting position (1, 2) would contain the following information:

1. The pixels affected by the jump. Three pixels are affected by jump 410: the starting pixel 404, the pixel immediately to the left of pixel 404 and the pixel immediately below and to the left of pixel 404. Note that when a jump is limited in length such that if a jump is described by a subpixel vector (x, y), then $-4 < x < 4$ and $-4 < y < 4$, where a pixel is four times as wide as a subpixel. With this limitation, any given jump can cross at most one horizontal and one vertical pixel boundary, and therefore touch at most 2 other pixels adjacent to the pixel containing the starting point of the jump.

2. The increments to be made to the winding number delta of the three pixels (block 166 of FIG. 5(b)) because of the jump. These winding number deltas are shown as 406, 407 and 408 in FIG. 15(a) for jump 410.

3. The contribution of the subjumps (into which jump 410 would be divided) to the correction region of the three pixels touched by 410. These contributions are shown as 412, 414 and 416 in FIG. 15(b), and would be used at block 172 (see FIG. 5(b)) to calculate the correction region. Each of these contributions would be a single number if the surface area method or the sample counting method is used, or, if the value-per-sample method is used instead, a list of the sample points whose local winding numbers should be incremented/decremented would be stored.

4. The end point of the jump—which will coincide with the starting point of the next jump—relative to the pixel that contains it: (2, 3) in FIGS. 15(a)-(b).

Several ways of organizing this information so that it may be used efficiently to implement the processes shown in blocks 166, 168 and 172 of FIG. 5(b) should be apparent to a person skilled in the art of computer graphics.

The size of the table depends on the size of the subgrid relative to the grid. The finer the subgrid, the smaller the error committed by rounding end points of jumps to subpixel grid positions, but the larger the table. For example, if the subgrid is $2^K$ times finer than the pixel grid (K=2 in FIGS. 14-15), and assuming a convention that assigns subgrid points on pixel boundaries to pixels so that each pixel contains $2^K \times 2^K$ subgrid points, then each jump can start at any one of the $2^{2K}$ subgrid points of a pixel.

If the projections of the jump must be less than $2^K$, then each component, J, of the jump must satisfy the inequality: $-2^K < J < 2^K$. Therefore, $2^{(K+1)}$ is an upper bound for the number of different values a component J can take. Because each jump has two independent components, $2^{(K+1)} \times 2^{(K+1)}$, or $2^{(2K+2)}$, is an upper bound for the number of different jumps. Combining this with the possible starting points, we get an upper limit of $2^{(4K+2)}$ possible contributions which have to be precomputed. For specific values of K, the number of table entries are as follows: for K=2, $2^{10}$ (1024) entries are needed, for K=3, $2^{14}$ (16,384) entries, for K=4, $2^{18}$ (262,144) entries, and for K=5, $2^{22}$ (4,194,304) entries. From these values, it seems safe to conclude that K should be either 2 or 3, that is, the subgrid should be either four or eight times finer, in each dimension, than the pixel grid. With K=4 or more, the table might be too large, and with K=1, the jump resolution would be half a pixel, which is often too coarse. While subgrids which are powers of two are discussed here, other divisions of pixels, while not as convenient for use with binary computers, are also possible.

Figure 16A:
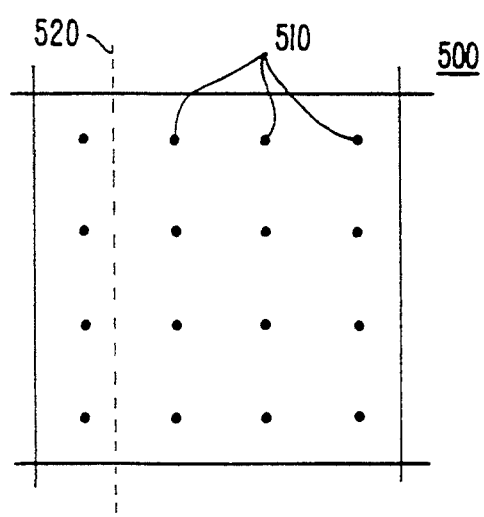
FIGS. 16(a)-(b) are illustrations of two placement patterns for sample points in a pixel.
Figure 16B:
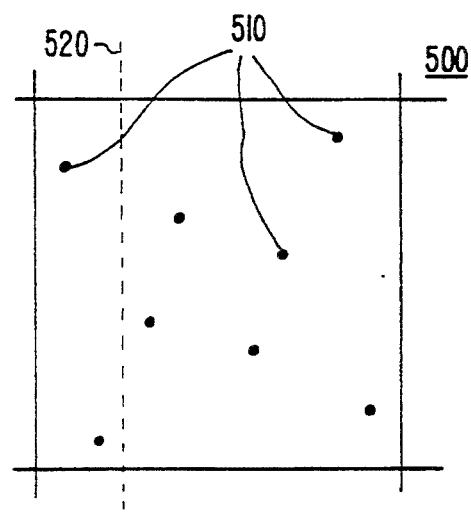

The placement of the sample points when the sample counting or value-per-sample methods are used in block 172 of FIG. 5(b) does not affect the efficiency of the method, but it may affect the quality of the results. FIGS. 16(a)-(b) depict two different placements of sample points 510 in a pixel 500. While the arrangement shown in FIG. 16(a) would seem more natural for a pixel grid, it can only distinguish between four different horizontal placements of a vertical line similar to line 520. By contrast, the sample point arrangement of FIG. 16(b) can distinguish eight different positions even though it uses only half the number of sample points. FIGS. 16(a)-(b) are offered to show that there is much to be gained by thoughtful placement of sample points.

When using the value-per-sample method to evaluate the contributions of jumps to correction regions of pixels, the precomputed table of values will contain a list of the sample points to be incremented or decremented for each pixel touched by the jump, rather than merely containing one positive or negative value indicative of the contribution of the jump. Given that the local winding number of each sample point is likely to be small, it is possible to store a good number of them in each machine word and derive some advantages from doing so. For example, if the method is implemented in a machine with 32-bit registers and 32-bit arithmetic, eight local winding numbers may be stored in each word by assigning four bits of the word to each local winding number.

Local winding numbers thus stored cannot take on more than 16 different predetermined values, such as the range [−8,7]. If this schema is used, the list of samples to be incremented or decremented kept in the table may take the form of a single 32-bit quantity that, when added to the word which stores the local winding numbers, produces the desired effect on each of the eight 4-bit counters stored in the word. In effect, this permits a number of additions (eight, in our example) to be performed in parallel and decreases the number of operations to be performed for each jump.

The above description is illustrative and not restrictive. Many variations of the invention will become apparent to those of skill in the art upon review of this disclosure.

Merely by way of example, computer 102 might be a more general computing environment, with distributed computing resources. Display 104 could be replaced by other image processing devices, such as a video recorder or image storage means. Printer 106 could be a laser printer, an ink jet printer, or an impact dot matrix printer. The identification of inside, outside and boundary pixels (block 150 of FIG. 5(a)) may be performed without reference to a trace of the outline, instead examining directly the position of each pixel relative to the outline. The method described may be used to compute only a rectangular part of the raster shape defined by an outline, by preprocessing the outline or its trace in a straightforward manner; computing only part of a raster shape may be convenient if not all the shape is visible (for example, if it is placed at the edge of the display) or necessary if the raster shape defined by the outline is too large to be computed all at once and must instead be computed in pieces. The computation of the coverage values of boundary pixels (block 154 of FIG. 5(a)) may be computed by means different from decomposing jumps into subjumps and accumulating the subjumps contributions, such as performing a bi-level fill on a finer grid for only that boundary pixel. A different pixel-coverage criterium might be used besides the "upper left corner containment" pixel-coverage criterium, in which case the calculation of winding number deltas and winding numbers can be adjusted accordingly.

If jumps and subjumps are used as in FIG. 5(b), the manner in which they are used to implement blocks 166, 172 and 178 may be different from all the methods described above (surface area, sample counting or value-per-sample). Even if surface area, sample counting or value-per-sample are used, the contribution of a subjump may be computed in a manner which does not conform with that illustrated in FIGS. 11(a)-(d). Finally, FIGS. 5(a)-(b) describe sequential processes, but many of their steps can be performed in parallel or overlapped in time instead.

Also, regarding the use of the multi-level raster shapes in the apparatus of FIG. 1, application program 112 may use constant inside and outside colors in some cases and in other cases, such as overlaying a title on a video image, the inside and outside colors may change for each pixel.

The scope of the invention should, therefore, be determined not with reference to the above description, but instead should be determined with reference to the appended claims along with their full scope of equivalents.

What is claimed is:

1. A method for synthesizing a raster shape for display on a pixelated display device, where the display device is capable of coloring each of a plurality of pixels at grid points of a two-dimensional grid with one color of a plurality of colors, where the raster shape is a collection of pixels which approximate an ideal shape expressed as a plurality of arcs forming a outline overlaid on said plurality of pixels, and where the raster shape is a collection of coverage values associated with pixels of the plurality of pixels, a coverage value for a given pixel indicating a degree to which a pixel surface associated with the given pixel is inside a region defined by the outline, the method comprising the steps of:

associating a reference point with each pixel of said plurality of pixels;

traversing the outline and, for each visited pixel:

classifying said each visited pixel as a boundary pixel;

adjusting a local winding datum of said each visited pixel based on characteristics of a local traversal of the outline over said each visited pixel;

adjusting a correction value of each said visited boundary pixel, said correction value being a relative coverage value of said marked pixel relative to said reference point of said marked pixel;

assigning a coverage value to each pixel of the plurality of pixels by the steps of:

identifying a winding number of said each pixel from at least one of winding numbers of neighboring pixels, winding number data of said neighboring pixels or said local winding datum of said neighboring pixels;

if said each pixel is not a boundary pixel, assigning either an inside coverage value or an outside coverage value determined from said each pixel's winding number and an insideness criterium, thereby classifying said each pixel as an inside pixel or an outside pixel; and if said each pixel is a boundary pixel, assigning a coverage value calculated from said each pixel's winding number and said each pixel's correction value.

2. The method of claim 1, further comprising the steps of:

assigning an inside color to pixels classified as said inside pixels;

assigning an outside color to pixels classified as said outside pixels;

assigning a mixture of said inside color and said outside color to pixels classified as said boundary pixels, where the mixture for a given boundary pixel is a proportion of the inside color to the outside color determined by said coverage value for said given boundary pixel.

3. The method of claim 2, wherein said inside color and said outside color vary over the plurality of pixels, and wherein said mixture assigned to said boundary pixel is a mixture of inside and outside colors for said boundary pixel.

4. The method of claim 1, further comprising the step of rounding said coverage values for each of said boundary pixels to a value which is one of a finite set of allowable coverage values.

5. The method of claim 1, wherein colors of the plurality of colors are each shades of a single color.

6. The method of claim 1, further comprising the step of:

selecting a trajectory of said visited pixel which starts at a trajectory starting point and ends at a trajectory end point which is either a sink point or said reference point of a second pixel, where said sink point is an arbitrary point outside the outline which is assigned a winding number of zero;

and wherein said step of adjusting said local winding datum of a visited pixel further comprises the steps of:

incrementing said local winding datum when the outline crosses said trajectory in a first direction; and decrementing said local winding datum when the outline crosses said trajectory in a second direction which is opposite said first direction.

7. The method of claim 1, wherein said insideness criterium is a parity insideness criterium, wherein an odd winding number indicates a point inside the outline and an even winding number indicates a point outside the outline.

8. The method of claim 1, wherein said insideness criterium is a non-zero insideness criterium, wherein a non-zero winding number indicates a point inside the outline and a zero winding number indicates a point outside the outline.

9. The method of claim 1, said step of traversing further comprising the steps of:

representing the outline as a trace, said trace being a plurality of jumps approximating the outline, wherein a jump is a straight line segment; and classifying pixels which are touched by at least one jump as boundary pixels.

10. The method of claim 9, wherein said jumps are limited to straight line segments with a projection length of less than a predetermined distance along a vertical and a horizontal axis.

11. The method of claim 9, wherein said jumps are limited to straight line segments which do not cross a pixel boundary.

12. The method of claim 9, wherein said jumps are further divided into subjumps which do not cross pixel boundaries, and subpixel regions of boundary pixels are identified based on the subjumps within each boundary pixel.

13. The method of claim 9, wherein said jumps are constrained to begin and end at grid points of a subpixel grid, and said step of adjusting said correction value for boundary pixels further comprising the step of reading a coverage contribution from a look-up table containing contribution values for each allowed jump within a pixel, wherein said coverage contribution is an amount by which said correction value is adjusted.

14. The method of claim 9, wherein said step of adjusting said correction value for a boundary pixel further comprises the steps of:

calculating a contribution for each jump; and summing contributions for each jump which crosses said boundary pixel to determine an adjustment amount, said adjustment amount being an amount by which said correction value is adjusted in said step of adjusting said correction value.

15. The method of claim 14, further comprising the step of summing said contributions for each pixel such that a contribution is counted at most once for any given subpixel region.

16. The method of claim 14, wherein said step of calculating said contribution for each jump comprises the steps of:

identifying a subpixel region of said boundary pixel from said jump and a relative position of said jump to said boundary pixel and to said reference point of said pixel;

approximating a subpixel area of said subpixel region; and using a result of said step of approximating as said contribution.

17. The method of claim 1, wherein the step of assigning a coverage value for a boundary pixel further comprises the steps of:

calculating an interpolated value of said boundary pixel which is a value between zero and one which is an approximation of the ratio of the area of subpixel regions of said boundary pixel which are inside the outline to the total surface area of said boundary pixel; and setting said coverage value of said boundary pixel equal to said inside coverage value plus the product of said interpolated value multiplied by the difference between said outside coverage value and said inside coverage value.

18. The method of claim 17, wherein said interpolated value is equal to the ratio of the area of said inside subpixel regions to a total pixel area.

19. The method of claim 17, wherein said boundary pixel covers a plurality of sample points and said interpolated value is a ratio of the number of said sample points which are in inside subpixel regions to the total number of sample points inside said boundary pixel.

20. The method of claim 17, wherein said boundary pixel covers a plurality of sample points and said interpolated value is a ratio of a weighted sum of said sample points which are in inside subpixel regions to a weighted sum of said sample points which are inside said boundary pixel.

21. The method of claim 1, wherein the pixel surfaces collectively form a cartesian plane, wherein the outline unambiguously divides said cartesian plane into two disjoint point sets, one point set being inside the ideal shape and the other being outside the ideal shape, wherein a relation exists between points of said cartesian plane and the pixels of the display device such that each pixel of the display device is represented by an associated pixel surface.

22. A workstation comprising:

a raster display, which displays an image using a grid of pixels each colorable with one color of a plurality of colors to form an approximation of said image;

storage means for storing ideal shapes which are each described by an outline comprising at least one closed contour not limited by a resolution of said raster display;

relation means, coupled to a device parameter input and said storage means, for receiving device resolution parameters and for relating said ideal shapes received from said storage means to a pixel grid of said raster display;

direct multi-level filling means, coupled to said relation means, for performing a direct multi-level fill of pixels of said pixel grid by assigning color values to pixels found to be wholly inside and wholly outside said outline and computes color values for boundary pixels based on subpixel regions of said boundary pixels which lie inside or outside said outline, said direct multi-level filling means comprising:

outline traversing means, coupled to accept said outline, for traversing said outline and identifying said boundary pixels;

first storage means, coupled to said outline traversing means, for storing a correction value for each boundary pixel, said correction value indicating a local correction to a coverage value; and filling means, coupled to said first storage means, for assigning color values to pixels including assigning color values to said each boundary pixel computed from said correction value and global winding numbers of neighboring pixels; and second storage means for storing said computed color values for display on said raster display.

* * * * *